US008197657B2

(12) United States Patent
Bartels et al.

(10) Patent No.: US 8,197,657 B2
(45) Date of Patent: Jun. 12, 2012

(54) LIQUID TRANSPORT USING ELECTROWETTING SUPPORTED BY EFFECTIVE ARRANGEMENT OF ELECTRODES

(75) Inventors: Frank Bartels, Hattingen (DE); Dieter Jerosch, Bad Soden (DE); Andriy Bitman, Dortmund (DE)

(73) Assignee: Advanced Display Technology AG, Appenzell (CH)

(*) Notice: Subject to any disclaimer, the term of this patent is extended or adjusted under 35 U.S.C. 154(b) by 417 days.

(21) Appl. No.: 12/577,243

(22) Filed: Oct. 12, 2009

(65) Prior Publication Data

US 2011/0083963 A1 Apr. 14, 2011

(51) Int. Cl.
*G01N 27/453* (2006.01)

(52) U.S. Cl. ........................................ 204/600; 204/450

(58) Field of Classification Search .................. 204/450, 204/600

See application file for complete search history.

(56) References Cited

U.S. PATENT DOCUMENTS 4,390,403 A 6/1983 Batchelder
4,418,346 A * 11/1983 Batchelder .................... 345/107
4,636,785 A 1/1987 LePesant
6,911,132 B2 6/2005 Pamula et al.
7,189,359 B2 3/2007 Yuan et al.
7,976,128 B2 * 7/2011 Sugahara ........................ 347/54

FOREIGN PATENT DOCUMENTS

DE 102006035925 B3 2/2008
DE 102007039713 A1 2/2008
FR 2884243 A1 10/2006

OTHER PUBLICATIONS

Ui-Chong Yi and Chang-Jin Kim; "Characterization of Electrowetting Actuation on Addressable Single-side Coplanar Electrodes", J. Micromech. Microeng. 16 (2006) 2053-2059.

* cited by examiner

*Primary Examiner* — Alex Noguerola
(74) *Attorney, Agent, or Firm* — Marshall & Melhorn, LLC

(57) ABSTRACT

An arrangement of electrodes is provided in which there is a plurality of electrodes located in two planes and offset from one another in the direction of movement, and which within each plane are arranged in at least two electrically interconnected and alternating groups. A method is also provided for the movement or transport of drops of liquid utilizing the electrowetting effect and utilizing the above arrangement.

6 Claims, 5 Drawing Sheets

LIQUID TRANSPORT USING ELECTROWETTING SUPPORTED BY EFFECTIVE ARRANGEMENT OF ELECTRODES

FIELD OF THE INVENTION

This invention relates to electrodes for the unidirectional or bidirectional transport of drops of liquid utilizing the electrowetting effect. By means of this effect, drops of liquid that have a defined surface energy which experiences a variation by an electrical field can be moved and transported.

Specifically, the invention relates to geometric arrangements of electrodes which are capable of moving or transporting drops of liquid utilizing the electrowetting effect, whereby the effort and expense required in terms of circuitry is reduced to a minimum, and to a method for the movement of drops of liquid which is characterized by the smallest possible number of electrodes to be actuated, i.e. an effective arrangement of electrodes.

The term "electrowetting" means the action of the effect of an electrical field on the surface energy of a liquid. Liquids that can be used for this effect have the property of varying their surface energy in the presence of an electrical field. Under normal conditions, the surface energy decreases as the field strength increases. As a result of the reduction of the surface energy, the liquid spreads out over a surface which initially repels the drops, which surface is preferably simultaneously an electrode.

The variation of the surface energy, in the case of an individual drop, results in a variation of the contact angle at which the drops wet the substrate. The relationship between the field strength and the variation of the contact angle is described by the Lippmann-Young Equation and is familiar to a technician skilled in the art.

As a result of a local variation of the electrical field strength from zero up to a maximum value, the local surface energy of the liquid and thus the geometry of a drop can be correspondingly modified. In particular, the creation of a locally reduced surface energy can cause a movement of the drop by allowing it to expand preferably into the corresponding area which is characterized by the presence of an electrical field. Conversely, liquid is sucked out of the area where the surface energy is uninfluenced and therefore higher, because in this area the drop strives to assume the lowest-energy geometry, namely a spherical shape. The result is a net transport of liquid from the area of lower field strength into the area of higher field strength.

PRIOR ART AND DISADVANTAGES

To achieve the transport of liquid using the electrowetting effect, there must be a local variation of the surface energy. For this purpose, it must be possible to vary the electrical field locally. This variability in turn is conventionally achieved by placing a plurality of electrodes in the vicinity of the liquid or of the liquid drop in question so that the surface areas of the individual electrodes are smaller than the surface area of the liquid or the surface areas of the drops of liquid to be moved. It is known that both uniplanar and biplanar arrangements of electrodes can be used for this purpose.

In a uniplanar arrangement of electrodes, the desired variation of the electrical field is conventionally achieved by using strip-shaped electrodes, for example, electrodes whose longitudinal dimension runs at a right angle to the desired direction of movement of the drop. These electrodes are thereby designed so that they are significantly narrower in the direction pointing in the desired direction of movement than the length of the drops to be moved, i.e. in their dimension that points in the direction of movement. It is thereby guaranteed at all times that a portion, such as one end, for example, of the liquid drop is located in the vicinity of a first electrode, while other parts of the liquid drop are located in the vicinity of a second or additional electrode. By means of a suitable actuation of precisely the electrode which is located on that end of the liquid drop, in the direction of which the movement is to take place, the surface energy is correspondingly locally modified (reduced), so that the drop moves in the direction of this reduced surface energy.

Other uniplanar devices of the prior art use, instead of strip-shaped electrodes, arrangements of electrodes, usually in a regular matrix, which are also called electrode arrays. Conventionally, each individual electrode of the matrix can be actuated individually, so that particularly precise and geometrically relatively complex movements or variations in geometry of the drop of liquid to be moved become possible. For example, in addition to the linear movement of the drop, the drop can also be stretched, compressed, flattened etc. It thereby also becomes possible to direct a longish drop along defines paths which do not need to be bordered by side walls.

The opposite electrode which is necessary according to the invention is thereby frequently formed by the environment in which the apparatus is installed (unipolar variant). The field lines thereby run from the electrodes of the device into the open space and thus travel outside the interior of the devices. Alternatively, the opposite electrodes can also be arranged in alternation with the (main) electrodes in a plane, so that the field lines run in an arc from the electrodes of the one group to the electrodes of the other group (bipolar uniplanar variant).

In other such arrangements of the prior art, the opposite electrodes are located in a second plane above or below the (main) electrodes (bipolar biplanar variant). In this case, the field lines run essentially perpendicularly from the surfaces of the one electrode group to the surfaces of the other electrode group, although under normal conditions they do not travel outside the interior of the devices. In this last case, each of the main electrodes also has its own corresponding opposite electrode. To influence the electrical field, the main and the corresponding counter electrode are connected so that an electrical field is formed between them. The drops of liquid to be moved or transported then move in the direction of this locally generated field on account of the reduced surface energy.

In the cases described above, in which the field lines go outside the interior of the devices, it can happen that when there is a change in the environment of the devices and thus of the corresponding counter electrode, the field in the interior of the respective device also changes. Such a change is a disadvantage to the extent that an uncontrollable and random variation of the electrical field that acts from outside leads to an uncontrolled response during the desired movement or the desired transport of the drops of liquid in the interior of the devices.

In other exemplary cases described above, the number of electrodes that must be actuated is high. The same is true for the effort and expense of the circuitry required for this type of actuation. In the second case described above, an actuation of the individual electrodes that is based on the screen technology is required to execute the complex movements, because when it becomes necessary to activate an individual electrode, which is often very much smaller than the drop of liquid, little or no usable effect can be observed. These circuits as well as the high number of electrodes and power lines are too complex for simple cases and entail unnecessarily high costs for the manufacture of the components (electrodes, circuitry, power lines).

A great deal of effort is also required in the above referenced case of the biplanar electrode arrangements, to the extent that the counter electrodes must be actuated individually in connection with the respective main electrodes.

An additional and general problem in the use of the electrowetting effect is the danger of short circuits between neighboring or facing electrodes. The dielectric strength of the liquid which is located between the respective electrodes is limited. The danger of a breakdown also increases as the distance between the electrodes decreases. In highly miniaturized applications in particular, it is therefore desirable to keep the voltage required for the operation of the apparatus as low as possible.

Prior art publications U.S. Pat. No. 4,390,403 A and U.S. Pat. No. 4,418,346 A describe a device for the movement and transport of a drop of liquid, consisting of a first and a second plane with a plurality of groups, each of which has a plurality of base electrodes in which the planes run essentially parallel to each other at a distance between the planes, and whereby all the electrodes of a respective group are electrically connected with one another, the individual electrodes of the groups within a plane are in regular alternation with each other and a drop of liquid, without the action of the electrowetting effect, at least partly and simultaneously covers at least two neighboring electrodes of the second and/or first plane.

OBJECT OF THE INVENTION AND SOLUTION

The object of the invention is accordingly to provide a device for the unidirectional or bidirectional movement of liquids by means of the effect of electrowetting, in which the configuration of the electrodes that cause the local variation of the electrical field is as simple as possible, and in which also the simplest possible actuation of the electrodes leads to the desired movement or the desired transport of the liquid or the drop of liquid, whereby the voltages required for the operation of the device are minimized in comparison to the prior art or the dielectric strength is maximized.

The invention teaches that this object can be accomplished by the device and the method described herein.

Accordingly, the invention teaches an arrangement of electrodes in which there are a plurality of electrodes located in two places 1, 2 and offset from one another in the direction of movement, and which within each plane are arranged in at least two electrically interconnected and alternating groups X, Y and A, B respectively.

The invention also teaches a method for the movement or transport of drops of liquid utilizing the electrowetting effect and utilizing the device claimed by the invention, which in a first exemplary embodiment makes possible a particularly smooth movement of the drop of liquid and which in a second embodiment is characterized by a particularly low effort in terms of the circuitry required for the actuation of the electrodes in plane 1.

Additional preferred embodiments are described in the dependent claims, in the detailed description below and in the accompanying figures.

DESCRIPTION

The invention relates to the movement and transport of a drop of liquid by means of the electrowetting effect. The core of the invention is thereby the arrangement of at least two groups of electrodes in two planes that run parallel to each other, whereby the connection and actuation of the electrode groups can be accomplished particularly efficiently.

Accordingly, the device claimed by the invention comprises a first plane 1 with a plurality of groups X, Y, . . . and a plurality of base electrodes Xi, Yi, . . . , whereby the index i begins at 1, for example, and increases incrementally by 1. The electrodes are called base electrodes because, depending on the embodiment, they can be actuated by the control electrodes described below and therefore to a certain extent form the "basis" of the actuation. The device claimed by the invention therefore comprises a second plane 2 with a plurality of groups A, B, . . . each with a plurality of control electrodes $A_i$, $B_i$, . . . . These electrodes are called control electrodes because they are responsible primarily for the actual control of the movement of the drop of liquid.

The invention teaches that the planes 1 and 2 run essentially parallel to each other at a planar distance 3, and all electrodes $X_i$, $Y_i$, . . . , $B_i$, . . . have essentially plane active surfaces. "Essentially" means that the portion of an electrode which points in the direction of the drop of liquid is primarily flat, whereby depressions, elevations or variations in the cross section are acceptable as long as the flat character of the electrode is preserved.

The invention also teaches that all electrodes of a group X, Y, . . . , A, B, . . . are electrically connected with one another and can all be actuated together. "Electrically connected with one another" means that all the electrodes of a given group are connected by means of electrical lines. "Can all be actuated together" means that all the electrodes of a given group can be connected with or separated from a power source or a neutral conductor by means of a common switch, for example The invention also teaches that the individual electrodes of the group alternate regularly with each other within a plane. That means that within the plane 1, for example, in which the groups X and Y, for example, are located, first there is a first electrode $X_i$ of the group X which (in the longitudinal direction of a channel in which the transport of the drop of liquid is to take place) is followed by a first electrode $Y_1$ of the group Y. Then comes a second electrode $X_2$ of the first group X, which is followed by a second electrode $Y_2$ of the second group Y. Analogously, in the second plane 2 the electrodes can be arranged, for example, in the pattern $A_1$, $B_1$, $A_2$, $B_2$ etc. It is clear that when there are a large number of groups, a correspondingly larger number of electrodes will also be arranged one after another until the pattern repeats. If, for example, a plane comprises three groups A, B and C, which means that the corresponding sequence is $A_1$, $B_1$, $C_1$, $A_2$, $B_2$, $C_2$ etc.

The invention also teaches that the drops of liquid and/or the distance between electrodes 4 and 6 of the electrodes of the first 1 or second plane 2 are designed so that the drop of liquid, in the absence of the action of the electrowetting effect, covers two neighboring electrodes of the second and/or first plane at least partly and simultaneously. In other words, it must be ensured that the drop has the capability of getting into the field of action of at least two electrodes within one plane. Otherwise, it can happen that the drop, if it is in an unfavorable position, will not be sufficiently affected by the electrical field responsible for the movement, so that there will be no movement of the drop of liquid. To achieve this goal, the distance between two neighboring electrodes in a plane must be correspondingly small.

The device claimed by the invention is further characterized by the fact that it comprises a plurality of parallel channels, which in their longitudinal dimension comprise control electrodes of plane 2, and the likewise strip-shaped base electrodes of plane 1, which are arranged so that they run perpendicular to the longitudinal dimension of the channels and also pass through all the channels simultaneously. The result is a matrix-like arrangement of the electrodes of the second plane, whereby the matrix is constructed from lines that contain the electrodes of the second plane (control electrodes). The base electrodes which are also necessary for the movement extend not only into one single channel but run through all the channels at a right angle to the longitudinal direction of the channels, so that an activation of a base electrode group is noticeable in all the channels through which it runs. Nevertheless, it is possible according to the invention to move only drops in certain channels, because for this purpose the corresponding control electrodes must also be activated, and they can be activated individually for each channel. Therefore while only two base electrode groups are required for the entire device, (at least) two control electrode groups are provided for each channel.

While in theory any desired number of groups can be located within a plane, it is particularly preferable if the first plane 1 comprises exactly two groups of base electrodes X, Y and the second plane 2 also comprises exactly two groups of control electrodes A, B. These numbers represent a minimum configuration, and it is clear that to achieve the goal of a particularly efficient activation and construction of the device according to the invention, the lowest possible number of groups to be activated is advantageous.

In an additional preferred embodiment, the width of the space 6 or 4 between the electrodes of the first and second planes 1 and 2 respectively is as small as possible, while the electrode width 7 and 5 of the electrodes of the same plane is as large as possible. In other words, it is advantageous to use the largest possible electrodes with small spaces in between. In this manner, the coverage of almost 100% of the surface of a plane with electrodes and almost 0% of the surface without electrodes (i.e. the spaces between electrodes) is achieved. It goes without saying that the spaces between the electrodes must still be large enough that the drop is not exposed to undesirable influence by the electrical field. At the same time, steps must be taken to ensure that no short circuiting can occur between the electrodes of a plane. However, that safety measure is already achieved because, as claimed by the invention, at no point in time are electrodes that are next to each other energized at different potentials. Rather, the electrode next to an activated electrode is isolated from any potential and can therefore be considered an insulator.

In one particularly preferred embodiment of the invention, the width of the space 6 or 4 between electrodes and the electrode width 7 and 5 respectively of all the electrodes in a respective plane 1 or 2 essentially remains the same. In other words, the width of the electrodes and of the space between electrodes within a plane does not vary. In certain cases, however, it may be advantageous to deviate from this uniformity, especially if the channel cross section varies, because the longitudinal dimension of the drop of liquid to be transported will also vary on account of its unchanged volume, which leads to a variation of the degree of coverage in relation to the electrodes. In that case, for example when the channel widens, it may be advantageous to reduce the electrode width (measured in the longitudinal direction of the channel) and/or the width of the space between electrodes.

The most advantageous arrangement is an embodiment in which the sum of the space 6 between electrodes and the electrode width 7 in the first plane is exactly equal to the sum of the space 4 between electrodes and the electrode width 5 in the second plane 2. In other words, the interval which results from one electrode and the following space between electrodes remains the same in both planes. In this manner a particularly simple activation of the electrodes is possible for the purpose of moving and transporting the drop of liquid. It is thereby also particularly preferable to locate the spaces 4 between the electrodes A, B, . . . of the second plane 2 centrally over the electrodes X, Y, . . . of the first level 1. In other words, where an electrode is located in one plane, there is a space between electrodes in the other plane and vice versa. If the intervals in the first and second planes are equal, then the regular arrangement, once it has been established, remains intact. In an additional embodiment, the invention teaches that the drop of liquid is embedded in a carrier liquid or in a gas or gas mixture with which it forms a two-phase mixture. Carrier liquids that can be used include, for example, an aqueous solution or an oil, depending on the material of which the drops of liquid are made. The gases that can be used include cover gases or air, for example.

The invention also teaches that it is preferable if phylizing and/or phobizing coatings are located on the electrodes and/or the spaces between electrodes. For the sample case of a drop of liquid that consists of an aqueous solution, it is advantageous if both the electrodes and the spaces between the electrodes have a hydrophobic coating. Otherwise, the drops of liquid would a priori spread out too readily on the electrodes and the spaces between electrodes, so that a subsequent, sufficiently strong influence by an electrical field when the electrodes are activated could hardly be achieved.

In one exemplary embodiment of the device claimed by the invention, the invention The invention also teaches a method for moving and transporting drops of liquid by means of the electrowetting effect using a plurality of electrodes that are offset from one another in the direction of movement in two planes 1, 2, so that within each plane they are in at least two electrically interconnected and alternating groups X, Y and A, B respectively. This corresponds essentially to the device described above by the invention. Now, to achieve the movement of a drop of fluid from an electrode in Group A to an electrode in Group B, the method claimed by the invention comprises the following steps:

1. Activation of all electrodes of the first group A of the second plane 2, so that the drop of liquid is essentially located on an electrode of this group A;
2. Activation of all electrodes of the first group Y of the first plane 1;
3. Deactivation of the electrodes of the first group A of the second plane 2;
4. Activation of all electrodes of the second group B of the second plane 2;
5. Deactivation of the electrodes of the first group Y of the first plane 1, so that the drop of liquid is essentially located on an electrode of group B;
6. As a result of the sequence of activation and deactivation of the individual electrode groups claimed by the invention, the drop of liquid is moved from an electrode of group A to an electrode of group B, whereby both electrode groups are by definition located in plane 2.
7. If the drop of liquid is to be moved further to the next electrode of the first group A, the pattern must be repeated, whereby the corresponding electrode groups must be exchanged. Group A is accordingly exchanged with group B and group Y with group X.

In one particularly preferred exemplary embodiment of the method claimed by the invention, the following circuit activation plan is used, whereby the movement from an electrode of group A to a neighboring electrode of the same group A takes place:

1. Activation of all electrodes of the first group A of the second plane 2 and all electrodes of the second group Y of the first plane 1, so that the drop of liquid is located essentially between the electrodes of these two groups A, Y;

2. Deactivation of all electrodes of the first group A of the second plane 2 and activation of all electrodes of all electrodes of the second group B of the second plane 2;
3. Deactivation of all electrodes of the second group Y of the first plane 2 and activation of all electrodes of the first group X of the first plane 2;
4. Deactivation of all electrodes of the second group B of the second plane 2 and activation of all electrodes of the first group A of the second plane 2;
5. Deactivation of all electrodes of the second group X of the first plane 1 and activation of all electrodes of the second group Y of the first plane 1, so that the drop of liquid is again located essentially between the electrodes of the two groups A, Y;

whereby in the event of an activation of the electrodes A, B of plane 2, these electrodes are connected with a first potential, and in the event of an activation of the electrodes X, Y of plane 1, these electrodes are connected with a second potential.

The advantage of this method lies in the fact that the electrodes of the first and the second base electrode group (X or Y) are activated in alternation. When the electrodes of the one group are activated, the electrodes of the other group are deactivated and vice-versa. In contrast to the variant described above, the activation cycles therefore are alternated in a completely regular pattern, whereby the activation cycle of both base electrode groups is of equal length. An additional important advantage is that in the event of a continuous activation of the base electrode groups, there is a movement of the drop of liquid only when the corresponding control electrodes are also activated. As a result, the base electrodes can theoretically be activated continuously in alternation, even if no movement of the drop of fluid at all is desired. As a result of the separation of the activation of the base electrodes from the control electrodes the activation effort is simplified; only a synchronization of the two groups is necessary, to activate the control electrodes at the correct time if a movement is desired.

It is also particularly preferred if the second potential has a zero potential or the same amount as the first potential with the reverse sign. For example, the first potential can be provided by a positive voltage source and the second potential by an identical but negatively poled voltage source. Alternatively, the second potential can also simply be a zero potential. The only thing that is essential to the invention is that an electrical field of sufficient strength can be realized between the two potentials. If is thereby even irrelevant whether the more positive potential is connected to the second or the first plane; in the examples described above, it was assumed for reasons of simplicity that the potential of the second group is more positive than the potential of the first plane.

It is also particularly preferable if the delay times between the commutation is 0 ms. It has been determined that this value leads to particularly good results in the case of channels with a cross section of 2 mm. Of course, however, other values can also be used, depending on the geometry, the magnitude of the potentials and the drop material.

In an additional preferred exemplary embodiment, the electrical field which is formed on account of the difference in potential between the first and the second potential is at least briefly an alternating electrical field. In other words, the potentials described above change their sign several times in a short period, so that an alternating electrical field is formed. An alternating field of this sort can in certain cases lead to improved results in the movement or in the transport of the drop of liquid.

In an additional exemplary embodiment, the polarization of the alternating electrical field changes at a frequency of 500 GHz, and the curve of the variation follows the path of a square-wave or sine-wave curve.

LIST OF FIGURES

FIG. 1 shows a schematic construction of the electrode arrangement claimed by the invention.

FIG. 2A-E shows a first preferred method for the use of the device claimed by the invention.

FIG. 3 shows an overview in table form of the actuation plan on which FIG. 2 is based.

FIG. 4A-F shows a second preferred method for the use of the device claimed by the invention.

FIG. 5 shows an overview in table form of the actuation plan on which FIG. 4 is based.

FIG. 6 shows a plan view from overhead of an electrode arrangement which is constructed according to the principle claimed by the invention.

DESCRIPTION OF THE FIGURES

FIG. 1 also shows a second plane 2 with electrodes which can be combined into two groups, analogous to the electrodes in plane 1. To make a distinction, however, the letters A and B are used here; the corresponding switches are designated $S_A$ and $S_B$, and the corresponding second voltage source is designated $Q_2$. This voltage source supplies the electrodes $A_i$, $B_i$ in level 2 with a positive potential which is symbolized by the plus sign. Because in the illustrated exemplary embodiment these electrodes are used for the actual control of the drop movement, they can also be designated control electrodes. The electrodes in level 2 each have a space 6 between electrodes and an electrode width 5.

The electrodes on both levels are offset from one another. In other words, in a plan view (not shown), the electrodes $A_i$, $B_i$ of the second level 2 do not overlap the electrodes $X_i$, $Y_i$ of the first level 1, or at least not completely.

FIG. 2 shows a first preferred method for the use of the device claimed by the invention.

For reasons of simplicity, the accompanying illustration does not show the switches and wires. An activated electrode is symbolized by a thick line and a deactivated electrode by a thin line. The drop of liquid (called "drop" below, for the sake of brevity) to be moved in the direction of movement 8 is represented by the hatch-marked shape.

The method illustrated in FIG. 2 is characterized in that the electrode groups X, Y do not follow any fixed activation pattern, such as in particular a continuous square wave activation. In this manner a "smooth" movement of the drop of liquid is achieved, although the activation is somewhat more complex.

Figure 2A:
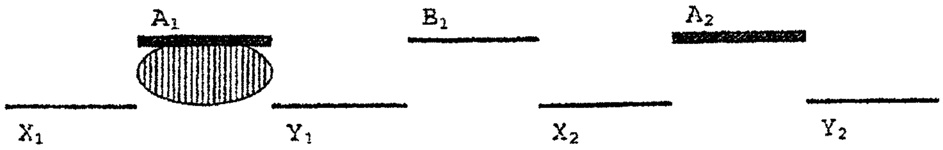

In FIG. 2A, the drop is at the electrode A. This electrode can but need not be activated. If, as shown, no other electrodes in the vicinity are activated, a drop tends to remain on the electrode A by adhesion. However, the activation of the electrode A can help to keep the drop there "active".

Figure 2B:
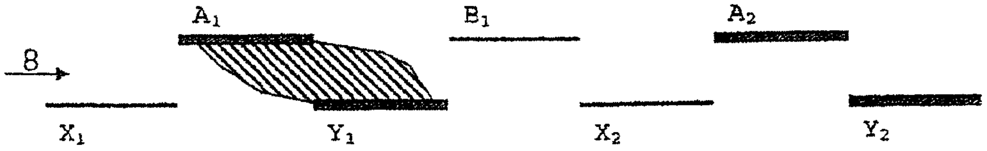

FIG. 2B shows a sideways movement in the direction of movement 8 of the drop. For this purpose, the control electrodes of group A and the base electrodes of group Y must be activated. Between these electrodes, an electrical field builds up so that the drop is stretched between these two electrodes. The field lines of the electrical field are represented by the direction of the hatching of the drop. This condition is stable as long as the two electrodes remain activated.

Figure 2C:
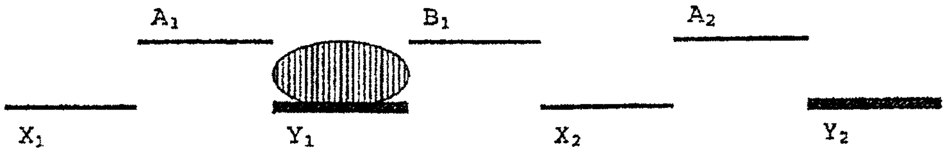

FIG. 2C illustrates the state in which the electrodes of group A are deactivated again. Now, however, the drop is "captured" only on the base electrode $Y_1$. Because the distance to the neighboring electrodes of the same group (e.g. $Y_2$) in the same plane (plane 1) which are also activated is too great, the drop cannot expand outward laterally.

Figure 2D:
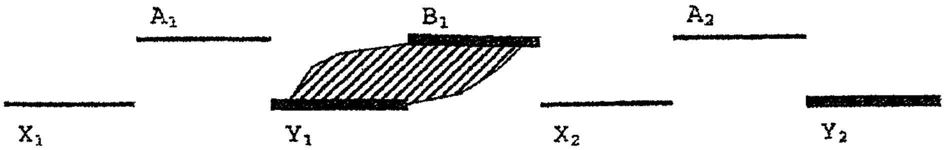

Now, to take another step in the direction in which the drop started out, in addition to the base electrodes of group Y, the control electrodes of group B are activated. The drop takes a shape between the electrodes $Y_1$ and $B_1$ which is approximately the same as illustrated in FIG. 2D. A movement in the opposite direction of electrode $A_1$ does not occur, since no electrical field extends in this direction.

Figure 2E:
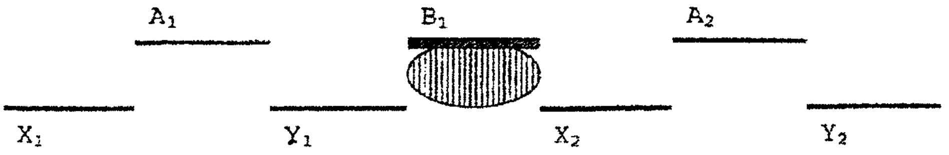

If now, as illustrated in FIG. 2E, the base electrode (group Y) is deactivated, analogous to the case of FIG. 2C the drop remains "caught" in the vicinity of electrode $B_1$.

The method illustrated here is then repeated analogously when the drop is to take another step, i.e. from the electrode $B_1$ to the electrode $A_2$. In particular, the sequence of the groups to be activated is the same. This sequence is illustrated schematically by the table in FIG. 3.

The first column of the table indicates the corresponding figure which shows the corresponding activation situation. The other columns stand for the individual electrode groups. A completed field indicates that the corresponding electrode group must be activated. The activation diagram is accordingly as follows:

8 A only
9 A and Y
10 Y only
11 Y and B
12 B only
13 B and X
14 X only
15 X and A
16 A only.

It should be noted that the last column of the table shows the same activation state as the first column. Therefore the table shows a complete cycle of movement and thus activation, to get from an electrode of group A to the next electrode of group A (e.g. from $A_1$ to $A_2$).

To move the drop into the opposite direction, the activation cycle must be executed in the opposite direction (in the table from bottom to top).

FIG. 4 shows a second preferred method for the use of the device claimed by the invention. This method is characterized in that the base electrodes X, Y are activated and deactivated alternately in a fixed rhythm. This rhythm is also retained even if there is to be no transport of the drop, in which case the control electrodes remain continuously deactivated, while the base electrodes continue to be activated in alternation. The field lines of the electrical field are illustrated as in FIG. 2 above by the direction of the hatching.

Figure 4A:
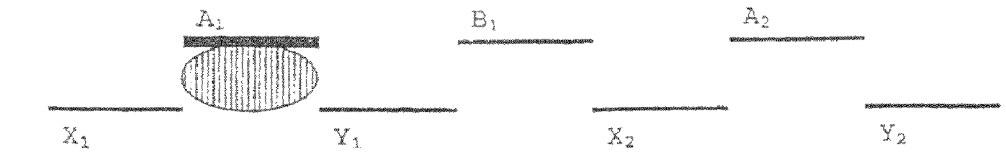

FIG. 4A illustrates a status that is present before the actual operation of the device. The drop is located on an electrode of group A, which is activated (thick line) and the drop is stationary on account of the electrical field, which interacts with the environment (in a manner not illustrated in any further detail).

Figure 4B:
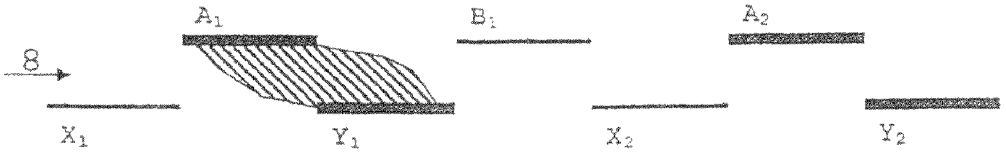

Now the actual operation begins, as illustrated in FIG. 4B. First the electrodes of group Y are activated. The drop is stretched between the electrode A1 and the electrode $Y_1$.

Figure 4C:
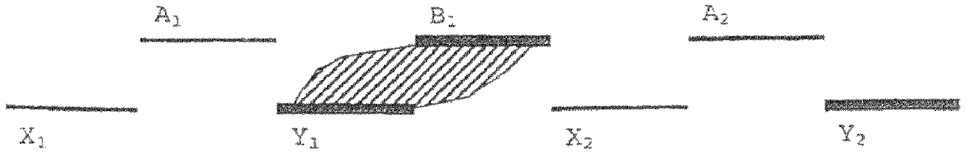

While the activation cycle of group Y continues, the control electrodes are switched from group A to group B, as illustrated in FIG. 4C. The drop accordingly travels from $A_1$ to $B_1$, although it also remains in contact with $Y_1$ the entire time, because this electrode group is likewise still actuated.

Figure 4D:
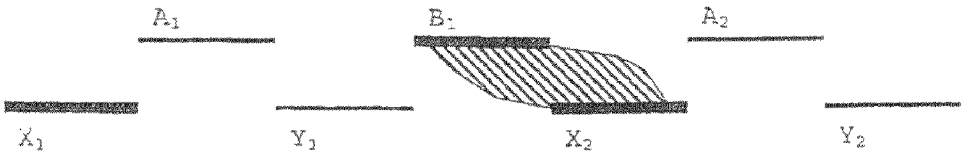

In FIG. 4D, the activation cycle of group Y then ends, and the activation cycle of group X, which is not activated, begins. The drop is now stretched between the (likewise still activated) electrode $B_1$ and the electrode next to it of the (activated) group X (electrode $X_2$). On account of the greater distance to another, likewise activated electrode of group X (electrode $X_1$, thick line), the drop is not moved (back) in its direction.

Figure 4E:
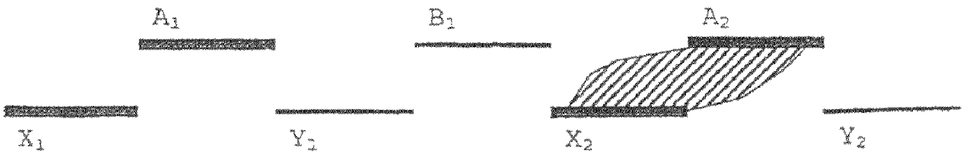

The activation cycle of the electrodes of group X also continues during the period illustrated in FIG. 4E. To then move the drop farther, however, the control electrode group changes from group B to group A.

Figure 4F:
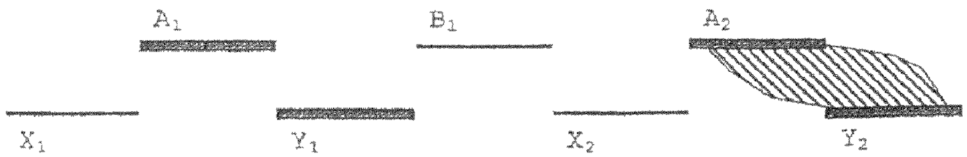

Finally the drop is moved from a first position connected with group A, as shown in FIG. 4B into a second position also connected with group A, as illustrated in FIG. 4F. For this purpose the activation cycle of group X ends, and a new activation cycle of group Y begins.

If the drop is not to be moved any farther, the control electrode group A can simply remain permanently activated. The drop then assumes in alternation a position as illustrated in FIG. 4E and FIG. 4F. If the drop is to remain completely still (see FIG. 4A), the base electrodes, on the other hand, must remain deactivated.

Figure 3:
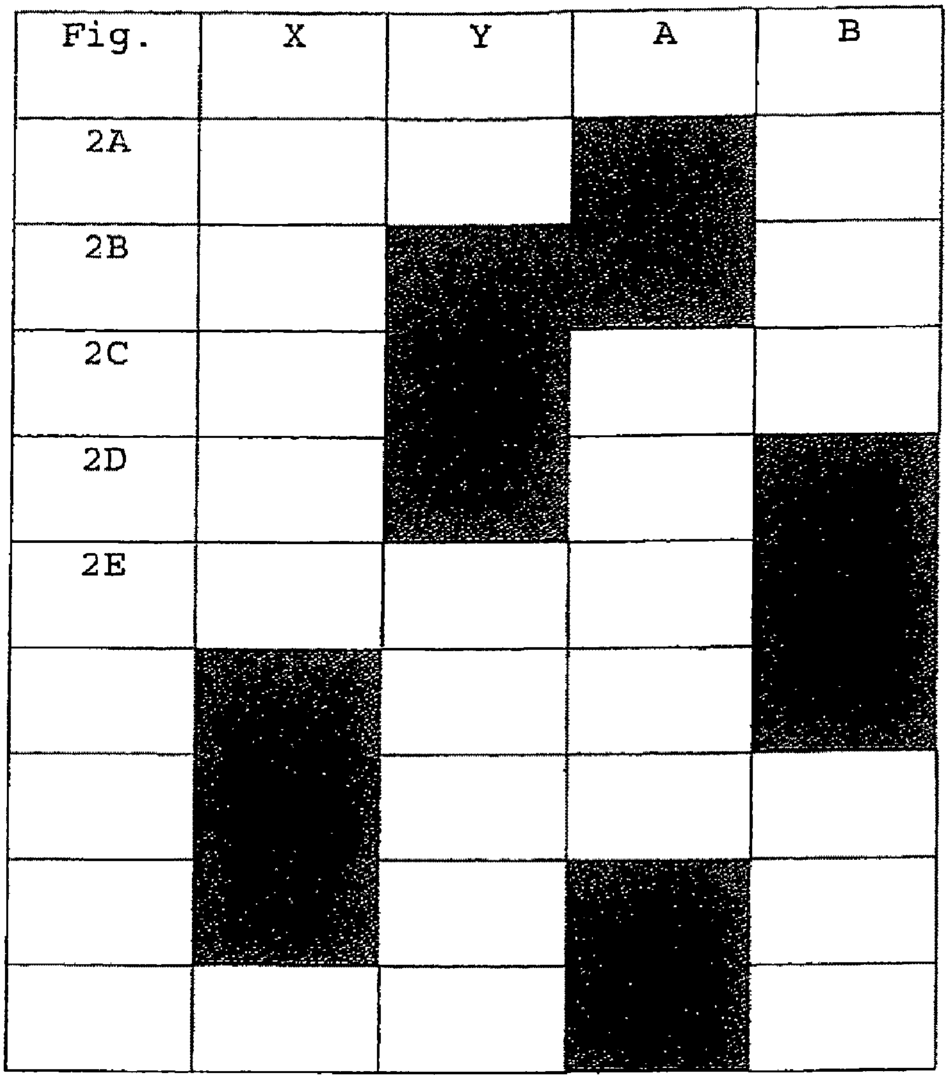

Analogous to FIG. 3, FIG. 5 shows once again the activation plan as it is illustrated in FIGS. 4B-F, and which transports a drop from an electrode of group A to a neighboring electrode of the same group. The figure clearly shows the alternating operation first of the electrodes of group Y, then of group X. The last column of the table finally shows the same configuration as the first column. At no point are both base electrode groups activated. The advantage of this activation plan over the one illustrated in FIG. 3 is that the alternating operation of the base electrodes must not be interrupted at any time. In a corresponding device, therefore, the base electrodes would be activated independently of a desired movement of the drop with the predetermined activation cycle, which can be provided by a simple square wave generator, for example. A filled-in field means that the corresponding electrode group must be activated. The activation plan is accordingly as follows:

17 A and Y
18 Y and B
19 B and X
20 X and A.

Figure 1:
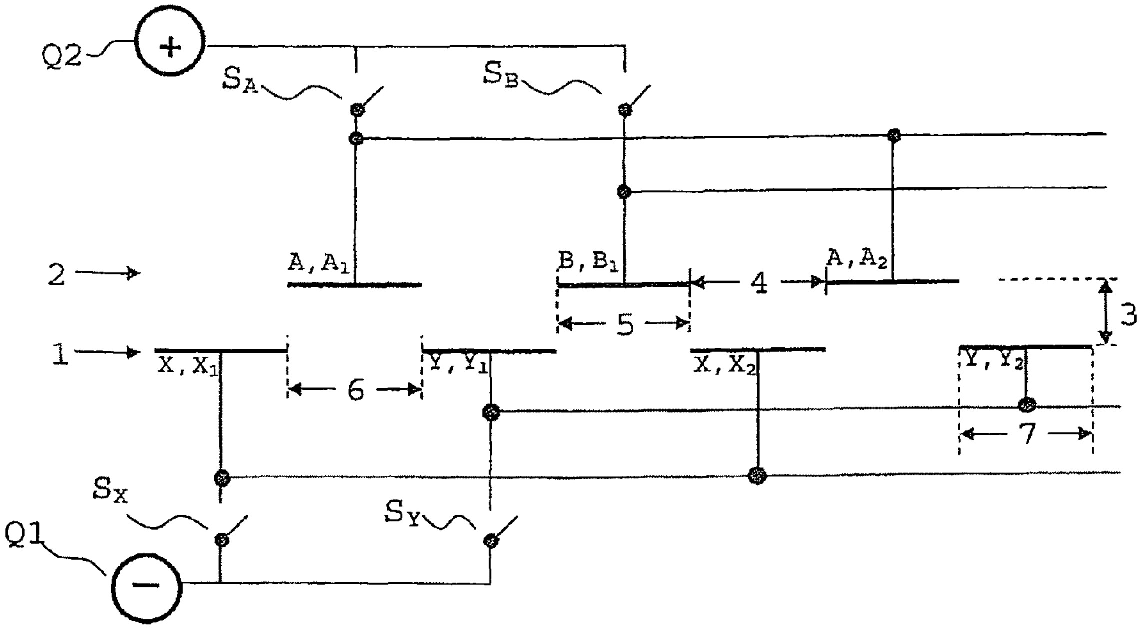
FIG. 1 shows a schematic construction of the electrode arrangement claimed by the invention. In a first plane 1, there are electrodes $X_i$, $Y_i$ which can be combined into two groups X, Y, which electrodes can also be called base electrodes. The index i thereby begins at 1, the next electrode of the same group X or Y then contains the index 2 etc. These base electrodes $X_i$, $Y_i$ accordingly form two groups X, Y, which in turn consist of electrodes $X_1$, $X_2$, . . . and $Y_1$, $Y_2$, . . . Within a group the electrodes are connected to one another by means of electrical wires (thin conductors). Each group is also connected by means of a switch $S_x$, $S_y$ with a first voltage source $Q_1$ which is represented in FIG. 1 in the form of a negative voltage source, symbolized by the minus sign. By activating the switch $S_x$, therefore, all the electrodes of group X are jointly connected to the potential of the voltage source $Q_1$. Analogously, by activating the switch $S_Y$, all electrodes of the group Y are jointly connected to the potential of the voltage source $Q_1$. The base electrodes are all separated from one another by a space 6 between electrodes and have an electrode width 7.
Figure 6:
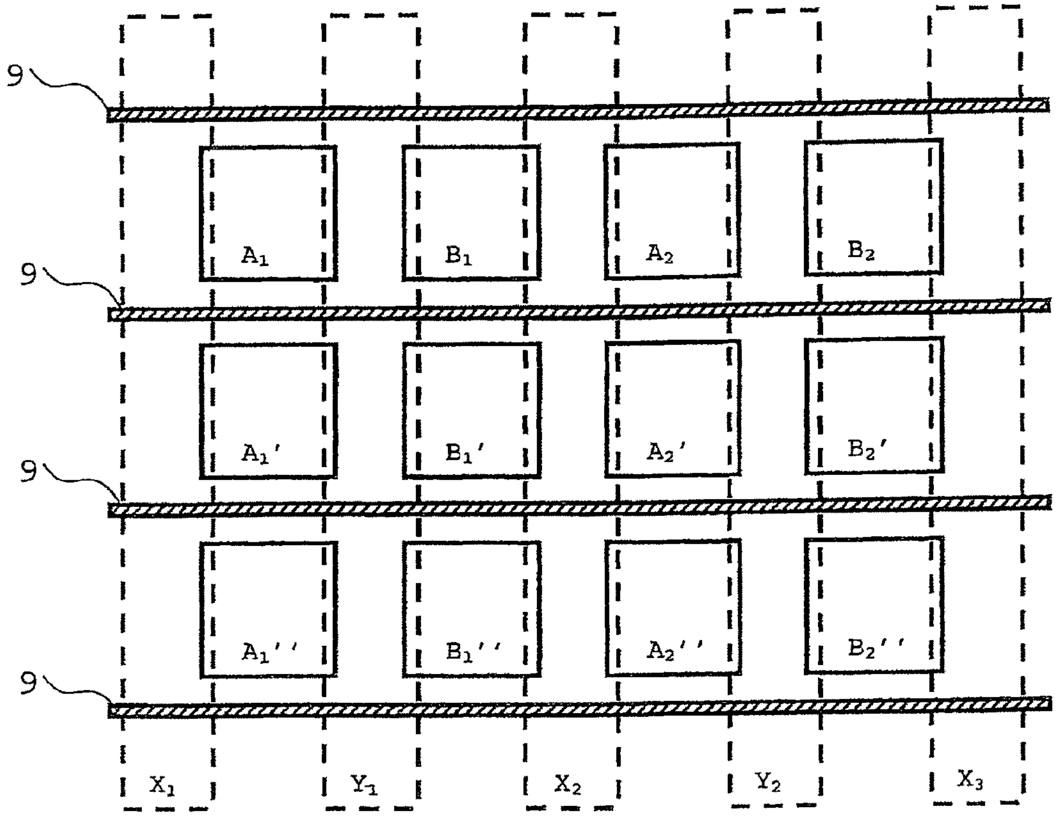

FIG. 6 shows a plan view of an electrode arrangement which is constructed according to the principle claimed by the invention. This arrangement consists of a plurality of parallel channels which are separated from one another by channel walls 9. In each channel there are control electrodes of two groups A and B or A' and B' and A" and B", which alternate with each other; the electrode $A_1$ is followed by the electrode $B_1$, then the electrode $A_2$ etc. Strip-shaped base electrodes X, Y, which are illustrated in broken lines, run transversely in relation to the channels. These base electrodes cross all the channels without thereby themselves being interrupted. For example, if the base electrode $X_1$ is activated, its potential is present in all the channels. The figures do not show the corresponding electrical lines and the voltage sources and the switches; in that regard, reference is made to FIG. 1.

Figure 5:
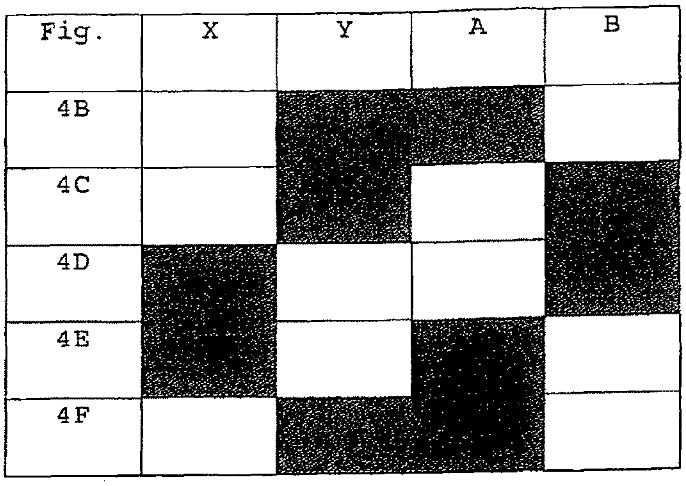

The illustrated exemplary embodiment preferably utilizes the alternating switching cycles described in FIGS. 4 and 5 for the base electrodes, i.e. the base electrodes are activated and deactivated continuously, in alternation and for example following a square wave curve.

Now, to move a drop in a channel from one position to another position, the corresponding control electrodes in this channel are activated. In a channel in which no transport of the drop is to take place, its control electrodes remain permanently deactivated, so that no "traveling" electrical field can be realized.

The advantage of the illustrated exemplary embodiment is that only a small number of base electrodes need to be provided, the control of which requires no information about the drops that are actually to be used, because they can be cycled "blind" to a certain extent. The constructive and activation effort is accordingly low. The illustrated variant accordingly represents a "passive matrix activation", in contrast to "active matrix activations," in which both the basic and the control electrodes must be operated in coordination with one another to achieve the desired directed transport of drops of liquid.

The invention claimed is:

1. Device for the movement and transport of drops of liquid by means of the electrowetting effect, comprising:

- a first plane (1) with a plurality of electrode groups (X), (Y), . . . , each with a plurality of base electrodes ($X_i$), ($Y_1$), . . . ;
- a second plane (2) with a plurality of electrode groups (A), (B), . . . , each with a plurality of control electrodes ($A_i$), ($B_i$), . . . ;

in which the first plane (1) and the second plane (2) run essentially parallel to each other at a planar distance (3) from each other and have all the electrodes ($X_i$), ($Y_i$), ($A_i$), $B_i$), . . . in essentially plane active surfaces, whereby:

- all of the electrodes of a given group (X), (Y), (A), (B), . . . are electrically connected with one another and can all be activated jointly;
- the individual electrodes of the groups regularly alternate with each other within a plane; and
- without the action of the electrowetting effect a drop of liquid at least partly overlaps at least two neighboring electrodes of the second and/or first plane simultaneously; characterized in that the device further comprises a plurality of parallel channels, which in their longitudinal dimension include control electrodes of the second plane (2), and which also comprise strip-shaped base electrodes of the first plane (1), which are arranged so that they run perpendicularly to the longitudinal dimension of the channels and run through all the channels simultaneously.

2. Device as recited in claim 1, characterized in that the first plane (1) comprises exactly two groups of base electrodes (X) (Y) and the second plane (2) comprises exactly two groups of control electrodes (A), (B).

3. Device as recited in claim 1, characterized in that the width of the space (6, 4) between electrodes and the electrode width (7, 5) of all electrodes within a plane (1, 2) are essentially the same.

4. Device as recited in claim 1, characterized in that the sum of the space (6) between electrodes and the electrode width (7) in the first plane (1) is exactly equal to the sum of the space (4) between electrodes and the electrode width (5) in the second plane (2).

5. Device as recited in claim 1, characterized in that the spaces (4) between the electrodes (A), (B), . . . of the second plane (2) are located centrally above the electrodes (X), (Y), . . . of the first plane (1).

6. Device as recited in claim 1, characterized in that the drop of liquid is embedded in a carrier liquid or a gas with which it forms a two-phase mixture.

* * * * *